Sept. 26, 1933.                    E. E. WICKERSHAM                    1,928,237
                                        PICK-UP
                                   Filed May 28, 1929                5 Sheets-Sheet 1
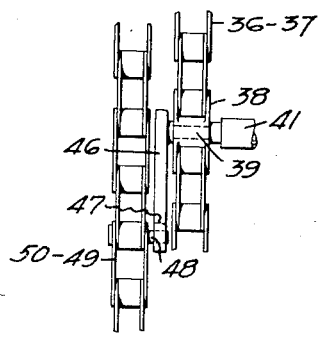
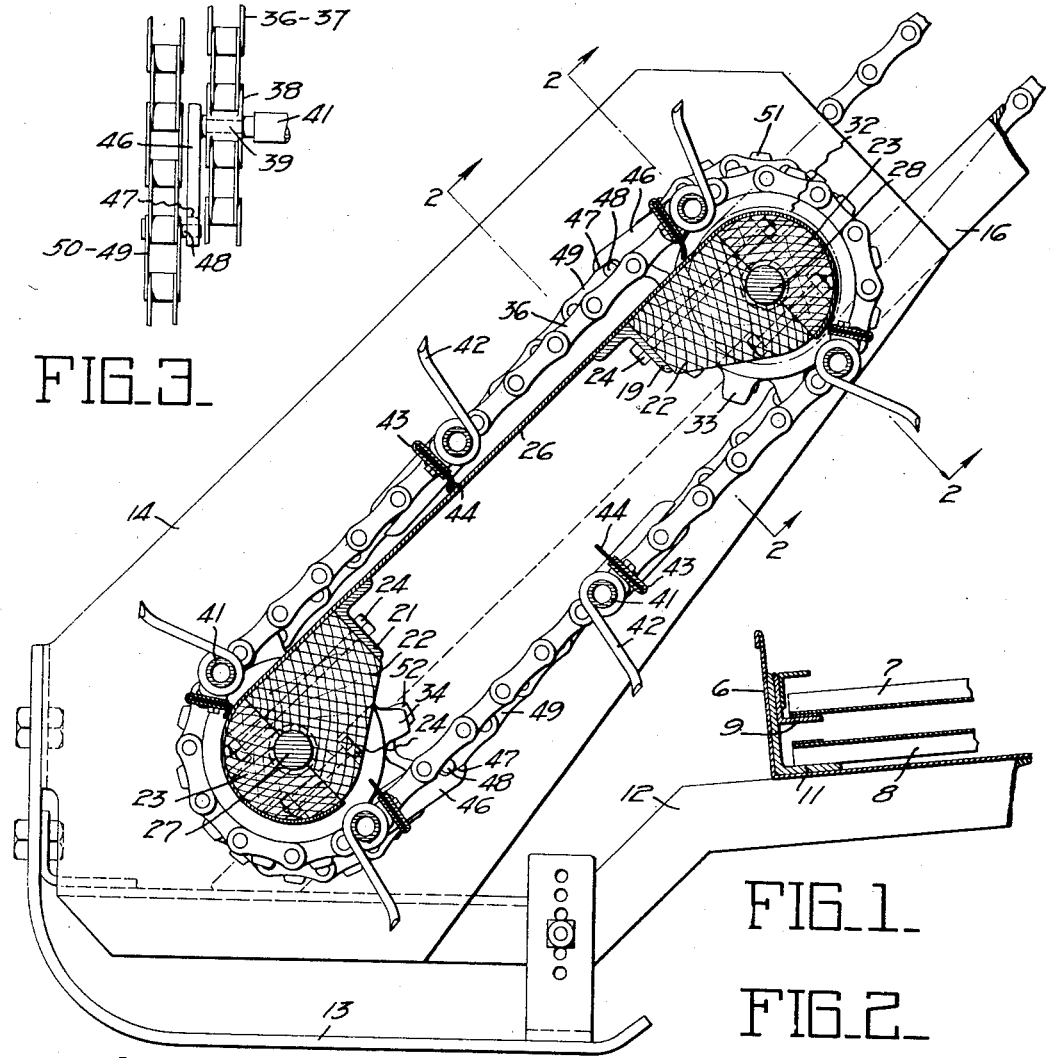
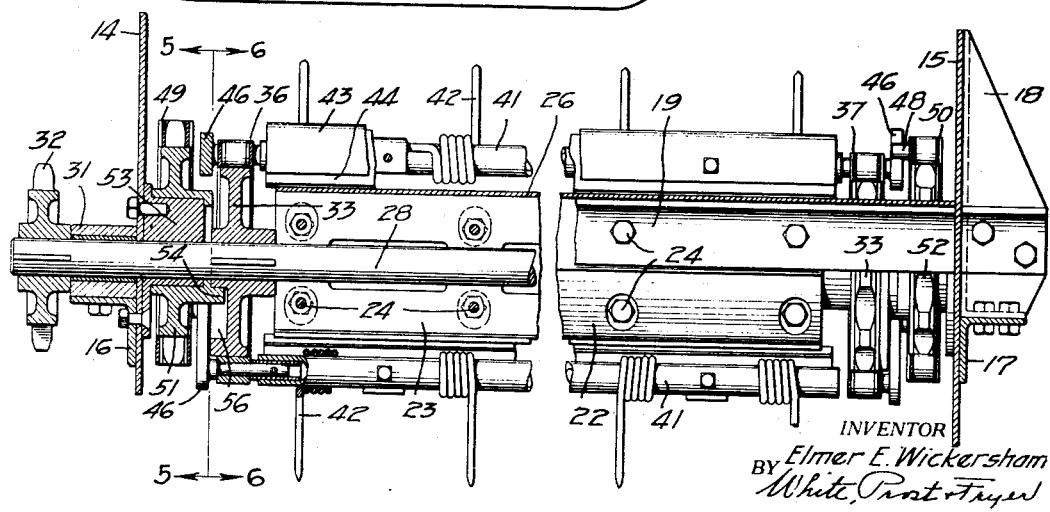
INVENTOR
BY *Elmer E. Wickersham*
ATTORNEYS Sept. 26, 1933.    E. E. WICKERSHAM    1,928,237
PICK-UP
Filed May 28, 1929    5 Sheets-Sheet 2
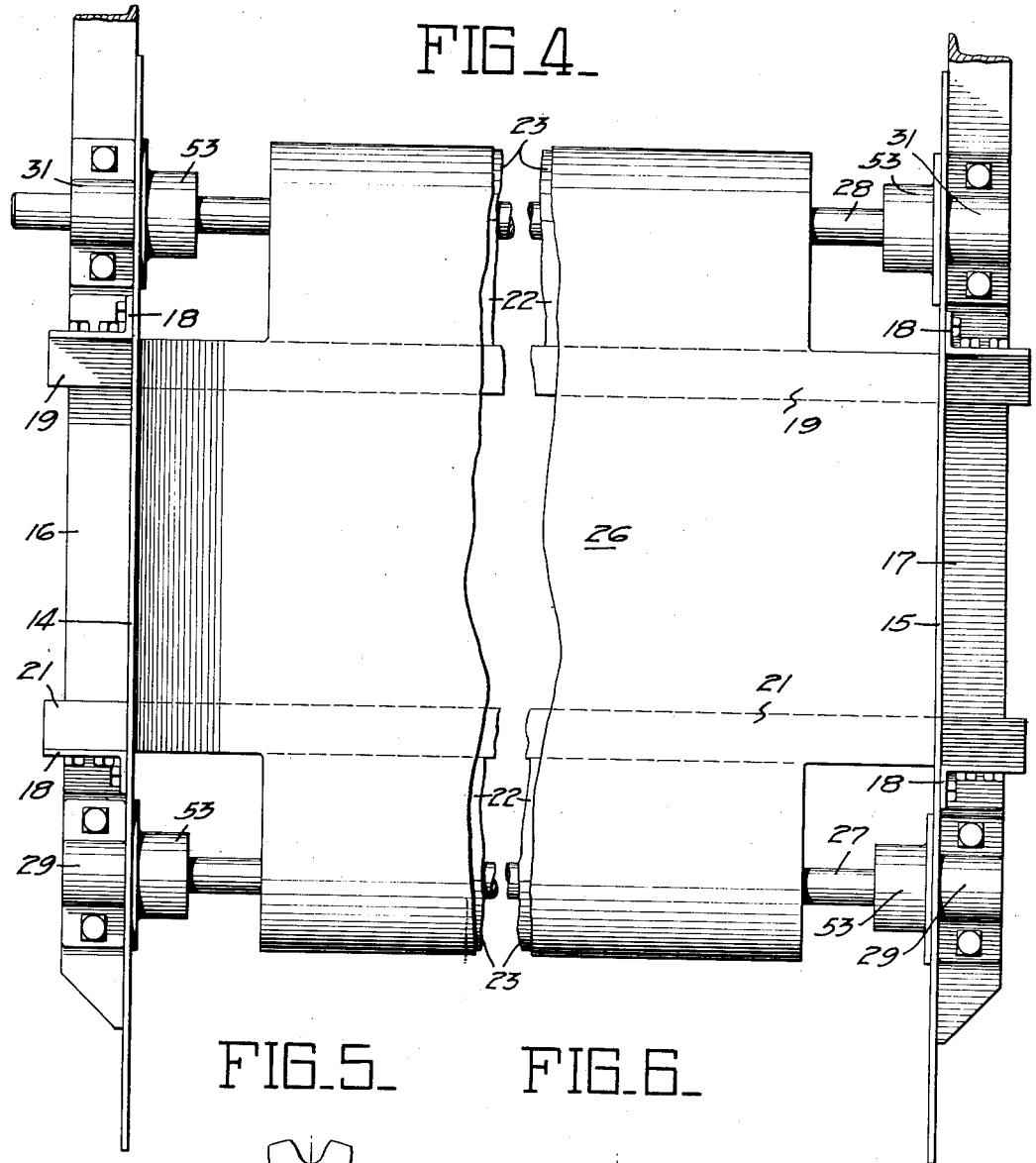
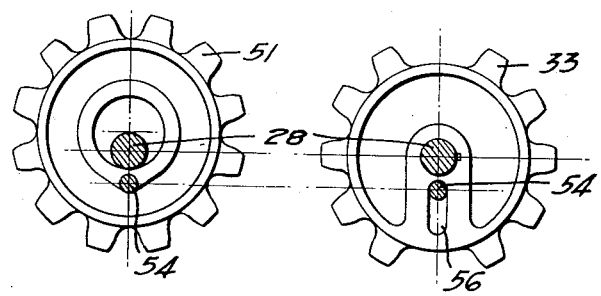
INVENTOR
Elmer E. Wickersham
BY
ATTORNEYS Sept. 26, 1933.  E. E. WICKERSHAM  1,928,237
PICK-UP
Filed May 28, 1929  5 Sheets-Sheet 3
FIG_7_
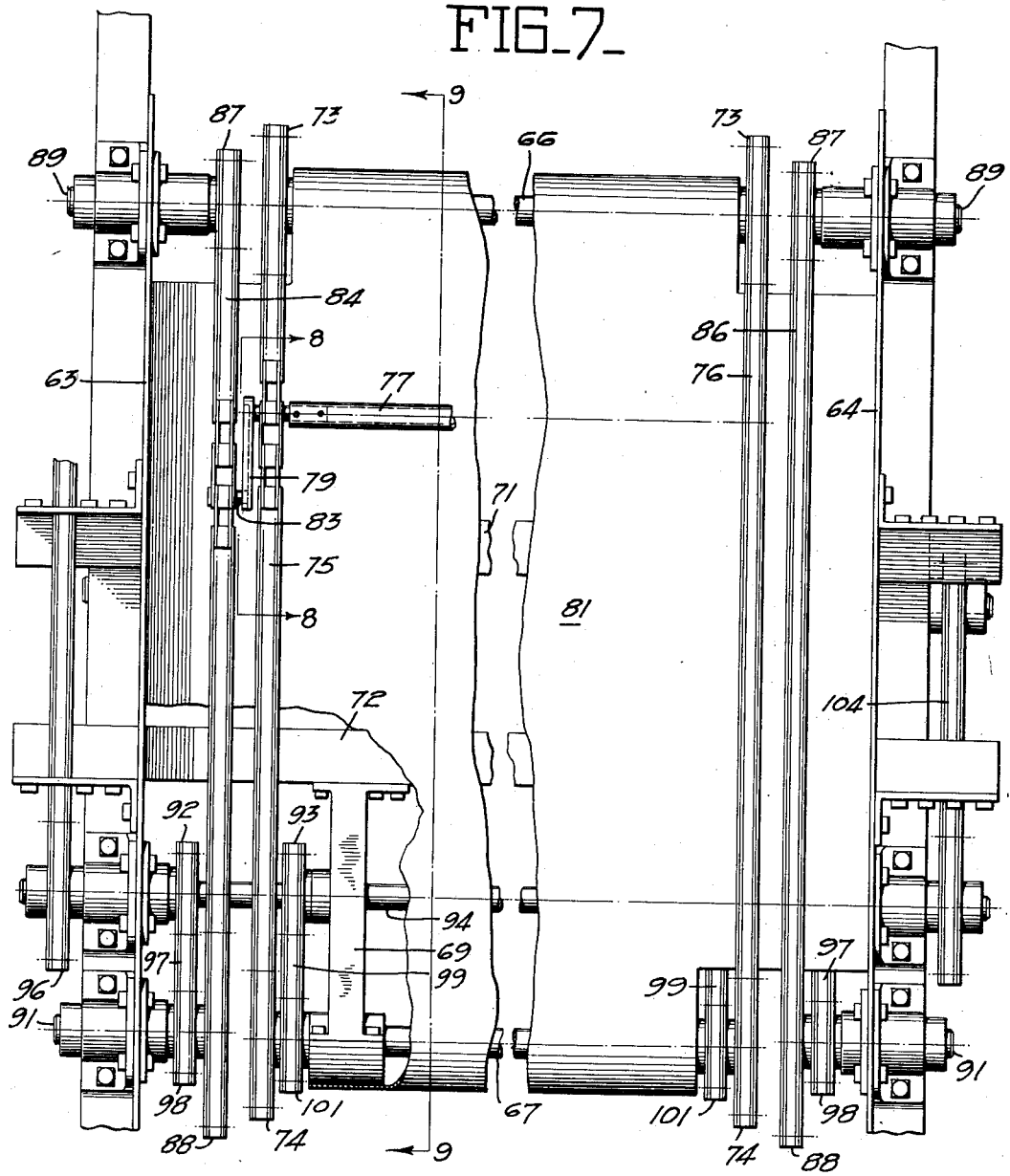
FIG_8_
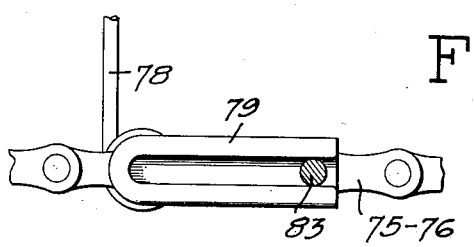
INVENTOR
Elmer E. Wickersham
BY
White, Prost & Fryer
ATTORNEYS Sept. 26, 1933.  E. E. WICKERSHAM  1,928,237
PICK-UP
Filed May 28, 1929   5 Sheets-Sheet 4
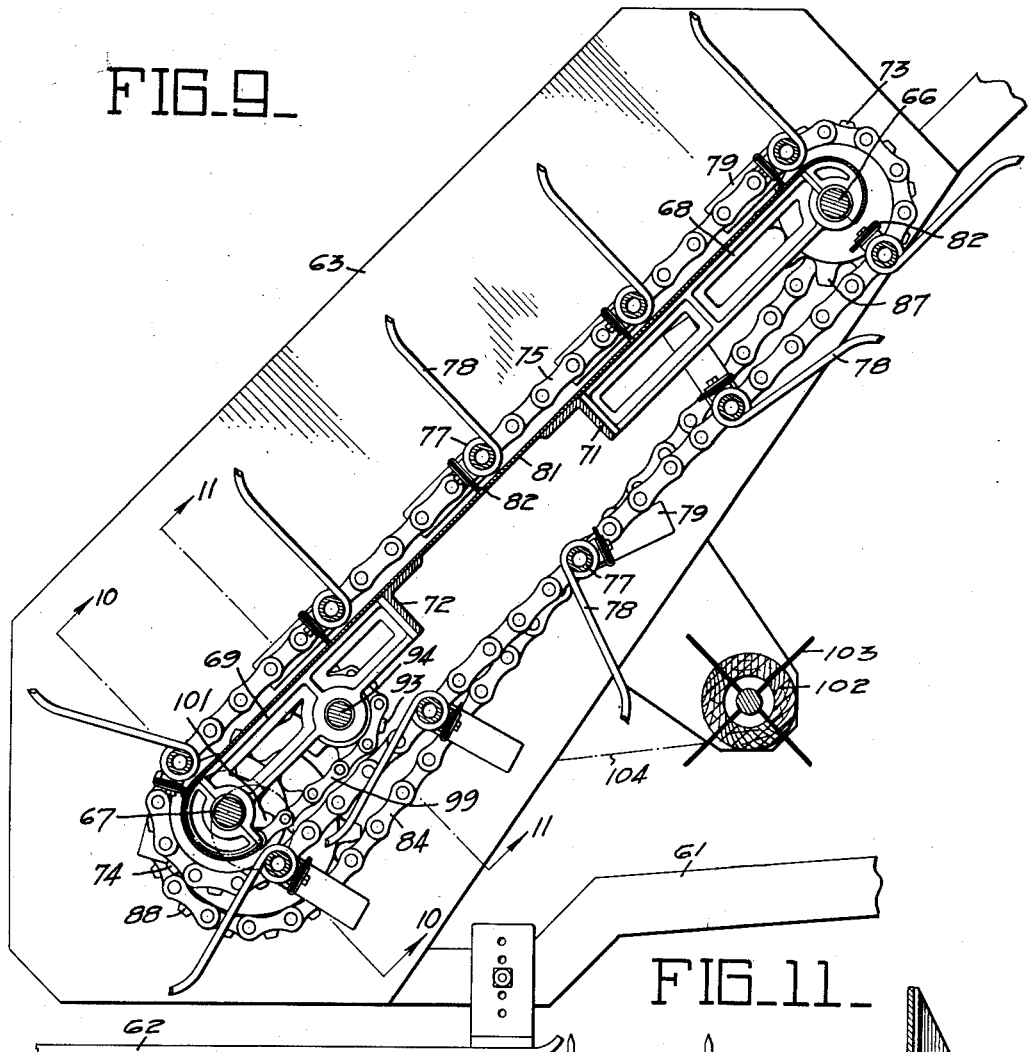
FIG_9_
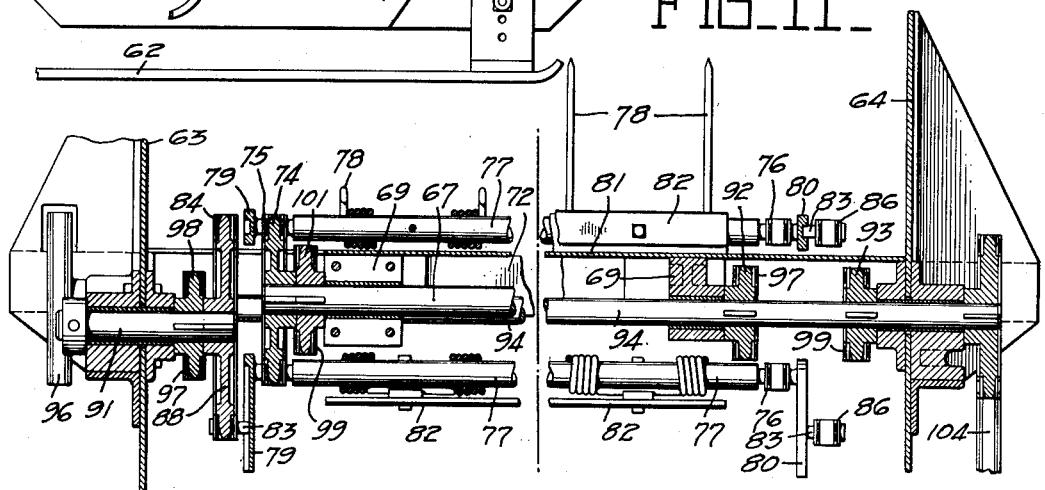
FIG_10_   FIG_11_
INVENTOR
Elmer E. Wickersham
BY
White, Prost & Fryer
ATTORNEYS Sept. 26, 1933. E. E. WICKERSHAM 1,928,237
PICK-UP
Filed May 28, 1929 5 Sheets-Sheet 5
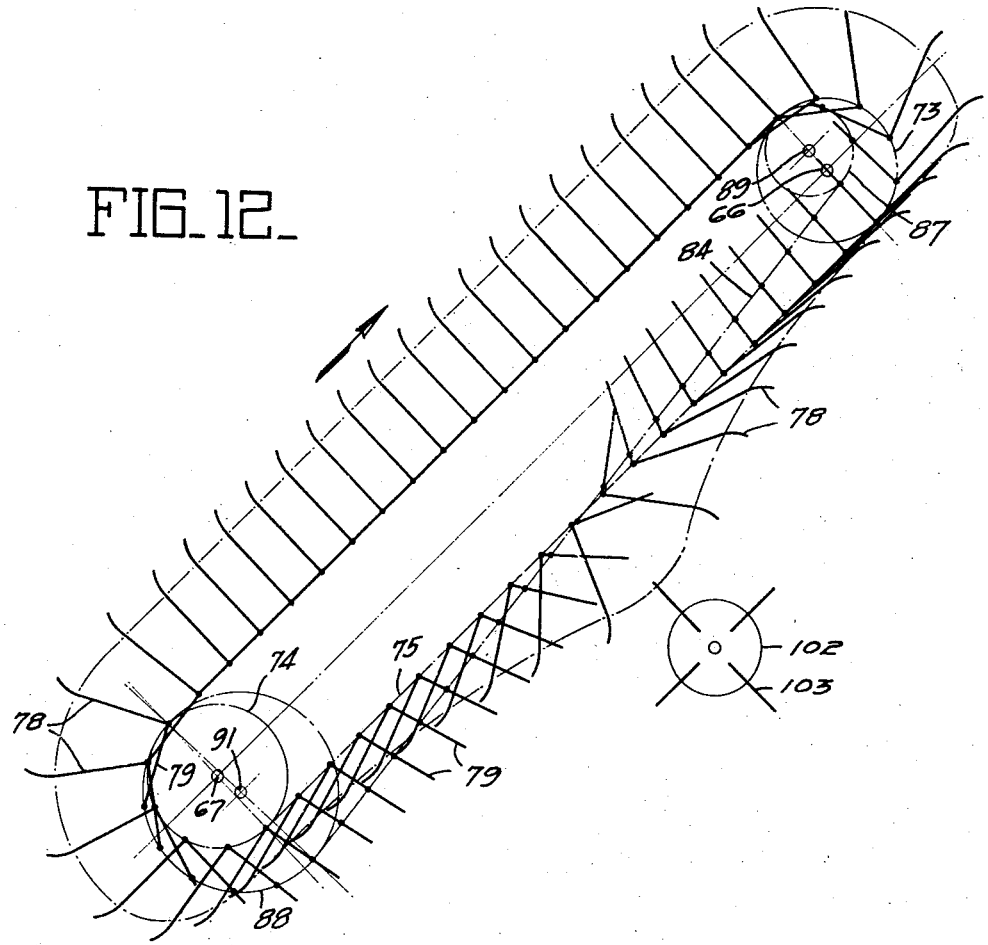
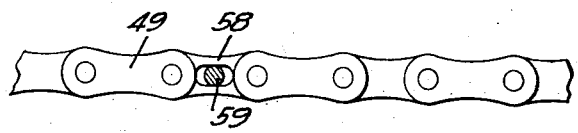
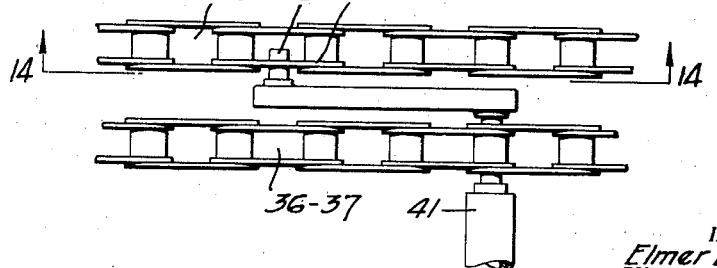
INVENTOR
*Elmer E. Wickersham*
BY *White, Prost & Fryer*
ATTORNEYS Patented Sept. 26, 1933

1,928,237

UNITED STATES PATENT OFFICE 1,928,237

PICK-UP

Elmer E. Wickersham, San Leandro, Calif., assignor to Caterpillar Tractor Co., San Leandro, Calif., a corporation of California Application May 28, 1929. Serial No. 366,585

53 Claims. (Cl. 56—351)

My invention relates to harvesting machinery and is especially concerned with devices of that class which may be propelled over a field in which cut grain is disposed for gathering in the cut grain and conveying it to mechanism for a subsequent harvesting operation. Such machines are ordinarily capable of picking up grain lying in windrows on the ground or of picking up grain which is bound together in shocks or bundles. It is deemed advisable in machines of this character to provide a plurality of tangs which are mounted on a conveyor and which project forwardly of the machine to engage the grain to be picked up. Various means have been proposed for attaching the tangs to the conveyor and it is with such attachments that my present invention is concerned.

An object of my invention is to provide means for attaching tangs to a conveyor in such a manner that the tangs are favorably presented to engage grain and to discharge engaged grain.

Another object of my invention is to provide a simple and economical device for obtaining angular movement of the tangs with respect to the axis of the tang bars as the tangs are engaged with the material and disengaged therefrom.

Another object of my invention is to provide a mechanism in which the tang angle is substantially unchanged despite wear in the mechanism.

The foregoing and other objects are attained in the embodiment of the invention shown in the drawings, in which Fig. 1 is a cross section transversely through one form of pick-up in accordance with my invention.

Fig. 2 is a cross section of the pick-up shown in Fig. 1, the planes of section being indicated by lines 2—2 of Fig. 1.

Fig. 3 is a detail showing in plan a crank supported by two of the chains.

Fig. 4 is a plan of the pick-up disclosed in Fig. 1.

Fig. 5 is a cross section on the line 5—5 of Fig. 2.

Fig. 6 is a cross section on the line 6—6 of Fig. 2.

Fig. 7 is a plan of a modified form of pick-up in accordance with my invention, certain portions being broken away to disclose the interior details.

Fig. 8 is a cross section on the line 8—8 of Fig. 7.

Fig. 9 is a cross section on the line 9—9 of Fig. 7.

Fig. 10 is a cross section on the line 10—10 of Fig. 9.

Fig. 11 is a cross section on the line 11—11 of Fig. 9.

Fig. 12 is a diagrammatic motion study of the tangs as disclosed in Fig. 9.

Fig. 13 is a plan of a portion of the chains of Fig. 9 showing a crank between them.

Fig. 14 is a cross section on the line 14—14 of Fig. 13.

In its preferred form, the pick-up of my invention comprises a pair of flexible means, such as chains, of equal length moving in non-coincident paths which between them constrain a crank for successively altering the angularity of a tang bar to present the tangs carried on the bar in the most advantageous manner to sweep the ground, to impale, lift, convey, discharge, and withdraw from material.

The pick-up of my invention is preferably attached to a header forming a part of a combined harvester. The header is provided with a frame 6 and includes a draper having an upper run 7 and a lower run 8 operating in tracks 9 and 11. Secured to the frame 6 is a framework 12 for the pick-up which at its forward end carries a plurality of adjustable runners 13 adapted to engage the ground and support the forward part of the mechanism.

Secured to the framework 12 is a pair of end boards 14 and 15. To effect the requisite rigidity of the end boards they are fastened to supports 16 and 17 connected through angles 18 with cross members 19 and 21. Each of these cross members is provided with a filler block 22 having a cap 23 secured thereto by through bolts 24. The filler blocks and caps provide points of attachment for a metallic center board 26 extending from adjacent the lower, leading portion of the pick-up to the upper, trailing portion thereof.

The filler blocks 22 and caps 23 are preferably apertured to provide journals for through shafts 27 and 28. The lower through shaft 27 is extended with its axis perpendicular to the plane of the end boards 14 and 15 through suitable journals 29 fastened to the supports 16 and 17 while the upper parallel shaft 28 likewise is mounted in journals 31 similarly fastened. The upper shaft 28 is preferably extended to one side of the framework to receive a sprocket 32 connected to a source of power so that the upper shaft is rotated in its journals.

To connect the upper shaft 28 with the lower shaft 27 and also to provide a suitable mounting for the pick-up conveyor I preferably key a pair of sprockets 33 to the upper shaft. These sprockets are in alignment with a similar pair of sprockets 34 on the lower shaft 27. Preferably all of these sprockets are equal in pitch diameter and are joined in pairs at either side of the pick-up framework by sprocket chains 36 and 37.

The sprocket chains are of special character and include at intervals special links 38 which preferably are blocks carrying through apertures into which project journal portions 39 of tang bars 41. Each tang bar is thus rotatable in its journals and on each tang bar is preferably affixed one or more tangs 42. Normally the tangs project tangentially from the tang bars and at substantially a right angle to the center board 26. Usually the tangs are constructed of a length of wire coiled into the shape shown in Fig. 2 to provide a pair of projections anchored at the center to the tang bar. Thus, since the tangs are of coiled wire, resilient tangs are provided. Also secured to each tang bar is a wiper 43 having a resilient lower projection 44 adapted to sweep the center board as the tang bars are conveyed upwardly thereover.

I provide the tangs in such a manner that they are both translated and rotated during movement so that they instantaneously occupy that position best suited to the use to which the tangs are being put; that is, the tangs are translated to pick up material and, at the same time, are rotated to most advantageously effect the pick up, thereafter being further translated and rotated to retain and transport picked-up material and to discharge completely the engaged and transported material.

Preferably secured to each tang bar 41 at each end thereof is a crank 46 which is fixed to the journal portion 39 and is provided with a longitudinal slot 47. Projecting into each slot 47 is an associated pin 48 fastened to one of two secondary chains 49 and 50 disposed at opposite sides of the framework proximate the end boards 14 and 15. Each of the secondary chains 49 and 50 operates over a pair of secondary sprockets 51 and 52 arranged respectively on the upper shaft 28 and the lower shaft 27. The sprockets 51 and 52 are of the same pitch diameter as are sprockets 33 and 34 but the secondary sprockets are eccentric with respect to their companion sprockets. It is to be noted that while the axes of rotation of the sprockets are parallel, a single plane contains only any two axes and, in addition, the plane containing the axes of an associated pair of sprockets does not include the axes of the other pair.

As shown in Fig. 2 the sprocket 51 is displaced so that its axis of rotation is parallel to and above the axis of sprocket 33. Sprocket 51 is mounted on an eccentric bushing 53 secured to one of the end boards 14 and is rotated preferably by a projecting lug 54 which engages with a slot 56 in sprocket 33 as shown in Figs. 5 and 6. A uniform angular rotation of sprocket 33 thus gives rise to a slightly varying angular velocity of sprocket 51. Sprocket 52 likewise has an axis of rotation parallel to but displaced below the axis of sprocket 34. The amount of displacement of the sprocket 52 is equal to but in the opposite direction from the displacement of the sprocket 51 so that the chain 49 which encompasses the two mentioned sprockets is slightly longer than chain 36.

It is to be noted that the chains move at about the same linear speed. However, by reason of the manner in which the chains are positioned, there is a difference in direction of movement, one chain diverging or converging with respect to the other. Since the cranks 46 are connected to both chains, this relative movement or difference in direction of movement causes the cranks to occupy different positions. The cranks 46 are connected to the tang bars 41, and the difference in direction of the chains is thereby effective to both translate and rotate the tangs. This is effective to locate the tangs approximately as shown in Fig. 1. The particular movement illustrated is effective in promoting the sweeping of grain from the ground, impalement of the grain and conveyance for discharge of the grain from the upper end of the pick-up onto the draper 7. As shown in Figs. 13 and 14 the mounting of the crank with respect to the secondary chains may be effected by slotted links 58 in the chain which are engaged by pins 59 projecting from the cranks.

There is shown in Figs. 9 to 12, inclusive, a modified form of the pick-up of my invention in which a framework 61 is provided at its forward ends with skids 62 for engagement with the ground. The skids and framework support end boards 63 and 64 between which are mounted an upper shaft 66 and a lower parallel shaft 67. Each of these shafts is journalled in supports 68 and 69 extending toward transverse cross members 71 and 72 secured to and forming part of the framework of the pick-up header. Each of the shafts 66 and 67 carries a pair of sprockets 73 and 74 around which sprocket chains 75 and 76 operate. The sprockets described are all of equal pitch diameter and are all mounted concentrically upon their respective shafts.

Connecting the sprocket chains 75 and 76 are transversely arranged tang bars 77 having affixed thereto tangs 78, which are similar in construction to tangs 42, being of resilient coiled wire. Each of the tang bars is preferably journalled in one of the links of each of the chains and carries at its extremities a pair of cranks 79 and 80. The tang bars overlie a center board 81 which at its ends is curved around supports 68 and 69. Fixed to the tang bars are drags 82 for contacting with the center board and sweeping kernels of grain thereover.

For securing the desired rotary movement of the tang bars within their respective chains to secure the desired sweeping, impaling, lifting, conveying, discharging, and withdrawal of the tangs, the cranks 79 and 80 are preferably engaged by pins 83 projecting from auxiliary chains 84 and 86 arranged proximate the chains 75 and 76. Each of the chains 84 and 86 passes around a pair of sprockets 87 and 88. The upper sprockets 87 are mounted on stub shafts 89 suitably journalled in the framework 61 while the lower sprockets 88 likewise are secured to stub shafts 91 also journalled in the framework 61. The upper sprockets 87 are of a pitch diameter less, by a selected amount, than the pitch diameter of the sprockets 73 while the lower sprockets 88 are of a pitch diameter greater, by the selected amount, than the pitch diameter of the sprockets 74. Thus the difference between the pitch diameters of sprockets 87 and 73 is the same as the difference between the pitch diameters of sprockets 88 and 74.

All of the sprockets are mounted so that the upper run of the chains 84 is substantially coplanar with the upper run of the chains 75. The two chains 75 and 84 and their corresponding chains on the opposite side of the framework are preferably driven through sprockets 92 and 93 on a drive shaft 94 journalled in the framework and connected by a sprocket 96 to a source of power. The sprocket 92 communicates by a chain 97 with a sprocket 98 on the stub shaft 91 while the sprocket 93 communicates by a chain 99 with a sprocket 101 on shaft 67. The two sprockets 74 and 88 are thus driven at substantially the same angular velocity so that the linear speed of chains 75 and 84 together with their corresponding chains on the opposite side of the framework is substantially identical.

By virtue of the fact that the two chains have divergent paths the effect of the cranks being mounted in both of them is to revolve the tang bars 77, and correspondingly the tangs, through a limited range which is illustrated in Fig. 12. This figure indicates that the tangs in rounding the lower, leading end of the pick-up framework assume a substantially horizontal position when they are sweeping the ground and engaging grain and a slightly inclined position when they are impaling the grain lying on the ground. It will be noted in Fig. 12 that when the tangs are in their lowermost position, nearest the ground, the tang bars are in line with a point on the bottom of the pitch circle 74 (Fig. 12), and that the tang is in an inclined position with respect to the ground. Grain lying on the ground in windrows would accordingly be engaged by the tangs when they are in this inclined position. On the other hand, it will be seen that when the tang bar is in line with a point approximately 90° clockwise farther on the pitch circle, the tang is in a position substantially horizontal, parallel to the ground. This is the tang position when engaging shocks of grain. The tangs are then positioned substantially perpendicular to the plane of the center board 81 throughout the movement of the conveyor over the center board. At the upper end, and as they round the trailing portion of the pick-up the tangs are retracted and lie substantially parallel to the center board thereby effecting a disengagement from the grain and pulling out of the grain in the most favorable manner. As they progress downwardly on the lower run of the circuit, the tangs are rapidly reversed and again assume their positions for the leading portion of the pick-up.

I have found it expedient to provide as a precautionary measure a wiping drum 102 carrying projecting resilient blades 103 for engaging the tangs as they are reversing themselves on the downward run. This drum is preferably journalled in the frame 61 and is suitably driven by a chain 104 connected to the drive mechanism.

It is to be understood that I do not limit myself to the form of pick-up shown and described herein, as the invention, as set forth in the following claims may be embodied in a plurality of forms.

I claim:

1. A pick-up comprising a chain, a tang bar rotatable in said chain, a crank on said tang bar, and a second chain connected to said crank for effecting rotational movement of said tang bar.

2. A pick-up comprising a chain, a tang bar rotatable in said chain, a second chain, and a connection between said tang bar and said second chain for effecting rotational movement of said tang bar.

3. A pick-up comprising a pair of chains having reaches movable in divergent paths relative to each other, a tang, means for connecting said tang for movement with said chains, and means operated by said chains for positioning said tang in various translated and angular positions.

4. A pick-up comprising a pair of chains, a tang bar rotatably mounted in said chains, a crank at each end of said tang bar, and a second pair of chains connected to said cranks, said chains translating and rotating said tang bar.

5. A pick-up comprising a pick-up frame, a pair of parallel chains on said frame, a tang bar rotatably mounted in said chains and disposed normally thereto, cranks on said tang bar, and a second pair of parallel chains connected to move said cranks to rotate said tang bars.

6. A pick-up comprising two chains having reaches movable in divergent paths relative to each other, a tang bar mounted in one of said chains, and a crank fixed on said tang bar and secured to the other of said chains.

7. A pick-up comprising two continuous, endless chains having reaches movable in mutually divergent paths, a tang bar rotatably mounted in one of said chains, and a crank fixed on said tang bar and movably secured to the other of said chains.

8. A pick-up comprising a pair of endless chains disposed parallel to each other but having reaches following divergent paths, a crank arm mounted on both of said chains, and a tang bar secured to said crank.

9. A pick-up comprising a pair of endless chains following divergent paths, a crank arm mounted for rotational and translatory movement by said chains, and a tang bar secured to said crank.

10. A pick-up comprising a pair of sprockets having parallel rotational axes, a second pair of sprockets having parallel rotational axes lying outside of a plane containing said first named axes, a pair of chains of substantially equal length encompassing the respective sprockets of each of said pairs, crank arms mounted on both of said chains, and tang bars secured to said crank arms.

11. A pick-up comprising four sprockets arranged with their rotational axes parallel and with only any two axes in the same plane, a chain encompassing two of said sprockets, a second chain of substantially equal length encompassing the remaining two of said sprockets, tang bars rotatably mounted in one of said chains, and crank arms secured to said tang bars and engaging the other of said chains.

12. A pick-up comprising four sprockets, a chain encompassing two of said sprockets, a second chain having a reach movable in a direction divergent from a reach of the first chain and encompassing the remaining two of said sprockets, a member positioned by both of said chains, and a tang bar positioned by said member.

13. A pick-up comprising a pair of coplanar sprockets having their axes of rotation parallel, a second pair of coplanar sprockets having their axes parallel and outside of a plane containing the axes of said first named pair, two chains each encompassing one pair of sprockets, and a cranked tang bar jouralled in one of said chains and having the cranked portion engaging the other of said chains.

14. A pick-up comprising a pair of chains having reaches which diverge, and a tang bar constrained by both of said chains.

15. In a pick-up, a series of tang bars, four chains, and means connected to said bars and to said chains to translate and rotate said bars upon movement of said chains.

16. In a pick-up, a series of tang bars, chains to carry said bars and other chains to oscillate said bars.

17. In a pick-up, a tang bar, a chain to support said bar, and a second chain to oscillate said bar.

18. In a pick-up, a tang bar, two chains, means to move said chains at substantially equal speeds, and means on said bar connected with said chains to translate and rotate said bar.

19. In a pick-up, a pair of chains of articulated links, and a tang bar translated by a link in one of said chains and rotated by relative movement between said link and a link in said other chain.

20. In a pick-up, a tang bar, a first chain, a second chain, and means for joining said tang bar to one of said chains for translatory movement and to the other of said chains to effect a rotary movement of said tang bar.

21. In a pick-up, a tang bar, a first pair of sprockets, a second pair of sprockets, a chain passed over each pair of said sprockets, means for mounting said tang bars for movement by said chains, said sprockets being positioned and adapted upon rotation to impart to said tang bars through said chains a rotary and a translatory movement.

22. In a pick-up, a tang, a pair of chains adapted for movement over circuitous paths, and means connecting said tang to said chains to translate said tang from a first position to another position and to rotate said tang during said translation.

23. In a pick-up, a tang, a tang bar for said tang, a pair of chains adapted to be moved over divergent paths, and means connecting said bar to said chains to translate said tang and said tang bar, and to rotate said tang bar to change the angular position of said tang.

24. In a pick-up, a tang, a first chain having a reach, and a second chain having a reach and movable, in a plane parallel to that of a plane containing the said first chain at a speed substantially equal to that of said first chain and with a link in said reach of said second chain moving relatively to a link in said reach of said first chain, and means connecting said tang to said chains.

25. In a pick-up, a tang, a first chain having a reach, a second chain substantially parallel to said first chain and having a reach, means for moving a link in said reach of said second chain relatively to a link in said reach of said first chain, and means connecting said links to said tang to oscillate said tang.

26. In a pick-up, a first chain link in a reach, a second chain link in a reach, and means for moving said links at substantially the same linear speed and relatively to each other in said reaches.

27. In a pick-up, a first chain link in a reach, a second chain link in a reach, and means for moving said links relatively to each other in said reaches.

28. In a pick-up, a tang, a carrying member for said tang, a control member for said tang, means movable in divergent paths and operatively connected to said members, and separate means for moving said movable means.

29. In a pick-up having tangs to sweep the ground to impale material thereon and lift, convey, discharge, and withdraw from said material, two flexible means movable relative to each other to oscillate said tangs.

30. In a pick-up, a tang, two means defining different circuits and movable over said circuits, and means connecting said tang to said two means to translate and rotate said tang.

31. In a pick-up, a tang, and means for moving said tang, including means movable over divergent paths defined by said movable means to oscillate said tang to impale, lift, convey, discharge, and withdraw from material.

32. In a pick-up, a tang, means for defining divergent paths and movable over said paths, to oscillate said tang through a path outside of said divergent paths.

33. In a carrier, conveyor means having a conveying reach movable over a path between a first position and a second position and also having a return reach movable from said second position to said first position, and means for removing material from the return reach of said conveyor means during movement from said second position to said first position.

34. In a pick-up, tangs, means for moving said tangs over a path, and flexible means positioned to contact said tangs for removing material impaled on the tangs.

35. In a pick-up, tangs, means for moving said tangs for translatory movement over a path, means for removing material impaled on the tangs, and means for moving said tangs relatively to said removing means in addition to said translatory movement.

36. In a pick-up, tangs, means for moving said tangs for translatory movement over a path, means for removing material impaled on the tangs, and means for moving said tangs relatively to said removing means in addition to said translatory movement to extend said tangs for removal of said impaled material.

37. In a carrier, a plurality of tangs movable over a path, and flexible means adapted to contact said tangs for wiping said tangs.

38. In a pick-up, a tang, a plurality of movable endless chains, each having a reach, means connected to a link of each chain for connecting the tang for movement with said chains, and means for mounting said chains to provide relative movement between said links in said reaches.

39. In a pick-up, a tang, a plurality of flexible movable means, means connected to each of said flexible means at predetermined positions for connecting the tang for movement with said flexible means, and means for mounting said flexible means to provide relative movement between said positions.

40. In a pick-up, a tang, a plurality of movable means, means connected to each of said movable means at predetermined positions for connecting the tang for movement with said movable means, and means for mounting said movable means to provide relative movement between said positions.

41. In a pick-up, a plurality of spaced movable chains, a tang bar journaled in one of said chains, another of said chains having an aperture therein, a crank arm connected to the tang bar, a pin on the crank arm of smaller cross sectional area than said aperture and engaging in said aperture, and means for mounting the chains to provide relative movement between said aperture and the tang bar journal.

42. In a pick-up, a plurality of spaced movable chains, a tang bar journaled in one of said chains, a crank arm connected to the tang bar, means on the crank arm connected to another of said chains, and means for mounting the chains to provide relative movement between the tang bar journal in one of said chains and the point of connection of the crank arm with said another of said chains.

43. In a pick-up, a plurality of endless, flexible and movable members, a tang bar journaled in one of said members, a crank arm connected to the tang bar, means on the tang bar connected to another of said members, and means for moving the members to provide relative movement between the tang bar journal in one of said members and the point of connection of the crank arm with said another of said members.

44. In a pick-up, an endless conveyor for transporting material and having a carrying reach for the material and a return reach, tangs movable with the conveyor, and flexible means adjacent the return reach for contacting and wiping material from said tangs.

45. In a pick-up, an endless conveyor for transporting material and having a carrying reach for the material and a return reach, tangs movable with the conveyor, a rotatable member adjacent the return reach, and a plurality of flexible blades rotatable with said member for contacting the tangs to wipe material therefrom.

46. In a pick-up, an endless conveyor for transporting material, tangs movable with said conveyor for translatory movement, means in addition to said translatory movement for imparting to said tangs an angular bodily movement, and means comprising a plurality of flexible rotatable blades for wiping material from said tangs.

47. In a pick-up, a plurality of endless, flexible and movable members, said members being spaced apart and each forming a reach, the reaches crossing each other, a tang, and means for connecting said tang for movement by said crossed reaches.

48. In a pick-up, a pair of spaced, endless and movable chains, the chains each forming an upper reach and a lower reach, the lower reaches being crossed, a tang, and means for connecting said tang for movement by said crossed reaches.

49. In a pick-up, a pair of spaced, endless and movable chains, the chains each forming an upper reach and a lower reach, the lower reaches being crossed, and the upper reaches lying in substantially the same plane, a tang, and means for connecting said tang to each of said chains for movement therewith.

50. In a pick-up, a pair of spaced, endless and movable chains, the chains each forming an upper reach and a lower reach, the lower reaches extending in divergent paths, and the upper reaches lying in substantially the same plane, a tang, and means for connecting said tang to each of said chains for movement therewith.

51. In a pick-up, a plurality of resilient tangs movable over a path, and flexible means adapted to contact said tangs for wiping said tangs.

52. In a pick-up, a plurality of resilient tangs movable over a path, a rotatable member positioned adjacent said path, and a plurality of resilient blades rotatable with said member for contacting the tangs to wipe material therefrom.

53. In a pick-up, a plurality of tangs, means for mounting said tangs for movement in a closed path, a rotatable member positioned adjacent said tangs, and a plurality of resilient blades projecting radially from said member for contacting the tangs to wipe material therefrom.

ELMER E. WICKERSHAM.